United States Patent
Mugnier et al.

(10) Patent No.: US 10,591,883 B2
(45) Date of Patent: Mar. 17, 2020

(54) SECURE CONFIGURATION OF A HOME-AUTOMATION INSTALLATION

(71) Applicant: SOMFY SAS, Cluses (FR)

(72) Inventors: Mickaël Mugnier, Bonneville (FR); Stéphane Marmey, Naves Parmelan (FR); Arnaud Desbiolles, Cornier (FR); Florent Grosset, Thyez (FR); Philippe Partakelidis, Viuz en Sallaz (FR); Guillaume Bruneau, Bonneville (FR)

(73) Assignee: SOMFY SAS, Cluses (FR)

( * ) Notice: Subject to any disclaimer, the term of this patent is extended or adjusted under 35 U.S.C. 154(b) by 427 days.

(21) Appl. No.: 15/502,700

(22) PCT Filed: Aug. 10, 2015

(86) PCT No.: PCT/EP2015/068393
§ 371 (c)(1),
(2) Date: Feb. 8, 2017

(87) PCT Pub. No.: WO2016/023871
PCT Pub. Date: Feb. 18, 2016

(65) Prior Publication Data
US 2017/0242420 A1    Aug. 24, 2017

(30) Foreign Application Priority Data
Aug. 11, 2014    (FR) ...................................... 14 57756

(51) Int. Cl.
*G05B 19/042*    (2006.01)
*G08C 17/02*    (2006.01)
(Continued)

(52) U.S. Cl.
CPC ......... *G05B 19/0426* (2013.01); *G05B 15/02* (2013.01); *G08C 17/02* (2013.01);
(Continued)

(58) Field of Classification Search
CPC ................ G05B 19/0426; G05B 15/02; G05B 2219/2642; H04L 12/2803; H04L 9/088; G08C 17/02; G08C 2201/42
(Continued)

(56) References Cited

U.S. PATENT DOCUMENTS 5,513,105 A * 4/1996 Krones ................... B60R 25/04
                                                            180/287
7,724,687 B2 * 5/2010 Autret ................ G07C 9/00857
                                                            370/255
(Continued)

FOREIGN PATENT DOCUMENTS

EP    1 587 044 A2    10/2005
EP    2 592 810 A1    5/2013

OTHER PUBLICATIONS

International Search Report and Written Opinion dated Dec. 12, 2015 issued in corresponding application No. PCT/EP2015/068393; w/ English partial translation and partial machine translation (18 pages).

*Primary Examiner* — David J Pearson
*Assistant Examiner* — Badri Narayanan Champakesan
(74) *Attorney, Agent, or Firm* — Westerman, Hattori, Daniels & Adrian, LLP (57) ABSTRACT

The method for configuring a home-automation apparatus (1) includes: at least one control point of a first type (3A, 4A) intended to communicate according to a first mode; and at least one actuator (5A, 6A) intended to communicate, after performing the configuration method, according to the first mode with at least one control point of the first type (3A, 4A) during usage mode, and which can communicate according to a second mode, secured by an encryption key, with a configuration device (2) during configuration mode. The configuration device implements the method which includes determining at least one actuator (5A, 6A) that can be
(Continued)

configured, obtaining a temporary encryption key having a limited period of validity, sending a message containing the temporary encryption key to the at least one actuator, communicating according to the second mode, secured by the temporary encryption key, with the at least one actuator in configuration mode.

24 Claims, 7 Drawing Sheets

(51) Int. Cl.
    *H04L 9/08*         (2006.01)
    *G05B 15/02*       (2006.01)
    *H04L 12/28*       (2006.01)

(52) U.S. Cl.
    CPC .......... *H04L 9/088* (2013.01); *H04L 12/2803* (2013.01); *G05B 2219/2642* (2013.01); *G08C 2201/42* (2013.01)

(58) Field of Classification Search
    USPC ....................................................... 380/255
    See application file for complete search history.

(56) References Cited

U.S. PATENT DOCUMENTS

| | | | | |
|---|---|---|---|---|
| 8,380,359 | B2* | 2/2013 | Duchene | G05B 19/042 700/276 |
| 9,747,787 | B2* | 8/2017 | Desbiolles | H04L 12/282 |
| 2004/0267515 | A1* | 12/2004 | McDaniel | G05B 19/0426 703/22 |
| 2005/0237957 | A1* | 10/2005 | Autret | G07C 9/00857 370/310 |
| 2007/0258508 | A1* | 11/2007 | Werb | H04W 84/18 375/140 |
| 2008/0036589 | A1* | 2/2008 | Werb | H04W 84/18 340/539.22 |
| 2008/0037431 | A1* | 2/2008 | Werb | H04W 84/18 370/241 |
| 2008/0037454 | A1* | 2/2008 | Werb | H04W 84/18 370/310 |
| 2008/0037569 | A1* | 2/2008 | Werb | H04W 84/18 370/406 |
| 2008/0040509 | A1* | 2/2008 | Werb | H04W 84/18 709/242 |
| 2012/0253483 | A1* | 10/2012 | Cavarec | G08C 17/02 700/83 |
| 2014/0071837 | A1* | 3/2014 | Werb | H04W 84/18 370/252 |
| 2014/0148952 | A1* | 5/2014 | Paz Lopez | H04L 67/34 700/275 |
| 2014/0286301 | A1* | 9/2014 | Werb | H04W 84/18 370/330 |
| 2015/0116811 | A1* | 4/2015 | Shrivastava | G08C 17/02 359/275 |

* cited by examiner

SECURE CONFIGURATION OF A HOME-AUTOMATION INSTALLATION

The invention relates to a method for configuring a home-automation installation comprising one or more control units and one or more actuators controlled by these control units. It also relates to a method of operation of an actuator of the home-automation installation. Lastly, it relates to an associated configuration device, actuator and home-automation installation.

In a home-automation installation, the actuators are the elements designed to control home-automation equipment such as screens for closing, for darkening, for protection from the sun or for projection, or devices for lighting, for heating or for air conditioning. They are controlled by one or more control units.

The control units may be mobile or fixed and capable of communicating with the actuators via a wireless or wired link, in a unidirectional or bidirectional fashion.

The actuators are capable of communicating according to at least two modes of communication disposing of different security mechanisms.

One mode of communication uses an encryption key. It is notably used to carry out configuration operations requiring a high degree of security which is based on an encryption of the communications.

Another mode of communication, which is simpler, does not require the use of an encryption key. In this case, the security relies for example on the following mechanism: during a pre-configuration step, the identifiers of the other elements with which it is authorized to cooperate are stored in each element of the home-automation installation; during the transmissions, each element inserts its identifier into the transmitted messages; when receiving, it verifies the identifier of the transmitter contained within each message received and only takes into account the content of the message if it knows the identifier received.

In this case, the security is based on the verification of the identity of the transmitter of the message by the receiver, who must have a prior knowledge of the latter.

The control units using this simpler mode of communication are less costly than the control units using the mode of communication based on the encryption of the messages; they are therefore financially advantageous for customers.

In order to configure a home-automation installation comprising actuators and one or more control units, a known solution is to use a configuration device, such as the installation tool "Set&Go io©" from the company Somfy; this type of device is generally used by an installer.

Such a configuration device does however have functional limitations for configuring home-automation installations only possessing control units using the simpler mode of communication. The following functions, requiring the transmission of the configuration data with a high degree of security during data exchanges, notably cannot be implemented:
re-naming the actuators;
recovery of installation data in the actuators;
modifying the setup of home-automation equipment controlled by an actuator, for example for re-adjustment of a security blind motor.

A control unit using the simpler mode of communication is therefore less expensive but has less sophisticated functions available than a control unit having an encryption key.

Currently, there are two solutions allowing an installer to assign an encryption key to an actuator.

According to the first solution, the installer uses a control unit dedicated to the installation which is specific to it. This control unit possesses its own encryption key that it transmits to the actuator (or to the actuators) to be configured. When the installer quits the home-automation installation, he/she leaves with his/her control unit and the associated encryption key. This is problematic because, later on, when another installer potentially comes to re-configure the home-automation installation, he/she will not be able to discover it owing to the fact that he/she does not know the encryption key initially used.

According to the second solution, the installer uses a control unit possessing an encryption key and leaves this control unit in the home-automation installation when he/she quits it. This second solution is costly. Furthermore, it requires an installer to be called upon who is qualified to modify the configuration at a later date, if necessary.

The present invention is aimed at improving the situation. For this purpose, the invention relates to a method for configuring a home-automation installation comprising:
at least one control unit of a first type, designed to communicate according to a first mode of communication, and
at least one actuator:
designed to communicate, at the end of the execution of the configuration method, according to the first mode of communication, with at least one control unit of the first type during an operation in utilization mode, and
capable of communicating according to a second mode of communication, made secure by means of an encryption key, with a configuration device during an operation in configuration mode,
the method being implemented by the configuration device and comprising at least:
a step for determining at least one actuator able to be configured,
a step for obtaining a temporary encryption key having a limited period of validity,
a step for sending a message containing the temporary encryption key to the at least one actuator able to be configured,
a first step for communicating according to the second mode of communication made secure by means of the temporary encryption key, with the at least one actuator operating in configuration mode.

According to the invention, the configuration device transmits a temporary encryption key to one or more actuators. This temporary key may be generated by the configuration device itself, or potentially by another entity. By definition, a "temporary" key is a key having a limited period of validity. This period of validity may be predetermined, in other words fixed in advance. In this case, it may be transmitted by the configuration device to the actuator with the temporary key. As a variant, it may be determined by sending an end of validity message coming from the configuration device and destined for the actuator. The end of validity message indicates the end of validity of the key, which is advantageously effective as soon as this message is received by the actuator. This temporary key is used to render the communications between the configuration device and the actuator secure, for example by encryption using the key of all or part of the transmitted data. The assignment to one or more actuators of a temporary encryption key allows the configuration device to access more sophisticated functions, notably configuration functions, requiring a high degree of security. It may rename an actuator, obtain installation information from the actuator, modify operational parameters for the controlled home-automation equipment, etc. Furthermore, as this key is temporary, it is erased from the memory of the actuator at the end of its period of validity. Thus, once configured, the actuator is reset to an intact state, without encryption key. After erasing the temporary key, the home-automation installation is in its virgin state and may henceforth be discovered by any other installer.

In one particular embodiment, the method is characterized
in that, according to the second mode of communication made secure by means of the temporary encryption key, the at least one actuator and the configuration device communicate as a transmitter and as a receiver,
and in that the method furthermore comprises a step for receiving, from the at least one actuator, a message for confirmation of end of validity of the temporary encryption key.

The communications using the mode of communication made secure by means of an encryption key may be bidirectional. This bidirectional mode of communication is here known as the "2W" (or 2-Way) type.

The actuator or actuators having received then erased the temporary key acknowledge, in other words confirm, the erasing of the key by sending a message for confirmation of end of validity to the configuration device. The latter may verify whether the actuator or actuators having received the key have correctly erased it, at the end of its period of validity. If an actuator does not confirm the erasing of the temporary key, the configuration device may trigger appropriate actions.

Advantageously, the determination step comprises a substep for receiving at least one message sent from the at least one actuator.

The step for determining at least one actuator able to be configured may consist in determining, from amongst the actuator or actuators of the home-automation installation, that or those capable of managing a temporary encryption key, based on messages coming from the actuators and each containing characteristics of the actuator.

According to one particular variant embodiment, the method comprises, prior to the determination step, a step for triggering the operation of the at least one actuator in configuration mode. Advantageously, the triggering step consists in carrying out a predetermined action on a control unit of the first type with which the at least one actuator is intended to communicate. For example, an installer can push a specific button of the "PROGRAMMING" type of a control unit paired with the actuator in order to trigger the sending of a request to switch into configuration mode.

In one particular embodiment, the method is characterized
in that the home-automation installation furthermore comprises at least one control unit of a second type capable of communicating according to the second mode of communication made secure by means of an encryption key specific to said control unit of the second type,
in that the at least one actuator is furthermore capable of communicating with the at least one control unit of the second type, according to the second mode of communication made secure by means of the encryption key specific to the at least one control unit of the second type, during an operation in utilization mode,
and in that the method furthermore comprises a second step for communicating according to the second mode of communication, made secure by means of the temporary encryption key, with the at least one actuator.

During the second communication step, the configuration device advantageously transmits data to the at least one actuator for managing the encryption key specific to said control unit of the second type. For example, the management data may comprise a command for erasing the key from the control unit or for replacing it by an encryption key specific to another control unit of the second type.

This embodiment allows the home-automation installation to be reconfigured by transforming the mode of communication of one or more actuators. Such a reconfiguration may be carried out when the control unit of the second type, with which the actuator or actuators are paired, is replaced by a control unit of the first type. It is to be noted that an actuator may be "mixed", in other words it communicates according to the first, simpler, mode of communication with a control unit of the first type with which it is paired, and according to the second mode of communication, made secure by means of an encryption key, with a control unit of the second type with which it is paired.

In the claims, the terms "first" and "second" are purely used to identify the steps in question. They do not imply any limitation of order, notably chronological or numerical.

The invention also relates to a method of operation of an actuator, the actuator belonging to a home-automation installation and being
designed to communicate, according to a first mode of communication, with at least one control unit of a first type belonging to the home-automation installation, during an operation in utilization mode, and
capable of communicating according to a second mode of communication, made secure by means of an encryption key, with a configuration device, during an operation in configuration mode,
the method being implemented by the actuator and comprising at least:
a step for receiving a message containing a temporary encryption key having a limited period of validity, coming from the configuration device,
a step for communicating according to the second mode of communication, made secure by means of the temporary encryption key, with the configuration device.

Advantageously, according to the second secure mode of communication, the actuator and the configuration device communicate as a transmitter and as a receiver, and the method furthermore comprises a step for sending a message confirming the end of validity of the temporary encryption key, destined for the configuration device.

The invention furthermore relates to a device for configuring a home-automation installation, said installation comprising:
at least one control unit of a first type, designed to communicate according to a first mode of communication, and
at least one actuator:
designed to communicate according to the first mode of communication with at least one control unit of the first type, during an operation in utilization mode, and
capable of communicating according to a second mode of communication, made secure by means of an encryption key, with a configuration device, during an operation in configuration mode,
the configuration device comprising at least one element for managing at least one temporary encryption key having a limited period of validity, said temporary key management element being arranged so as to determine at least one actuator able to be configured, to obtain a temporary encryption key, and to send a message containing the temporary encryption key to the at least one actuator able to be configured.

The invention also relates to an actuator for a home-automation installation, said installation comprising at least one control unit of a first type designed to communicate according to a first mode of communication, said actuator being
- designed to communicate according to the first mode of communication with the at least one control unit of the first type, during an operation in utilization mode, and
- capable of communicating according to a second mode of communication, made secure by means of an encryption key, with a configuration device, during an operation in configuration mode, characterized in that it comprises a communication module arranged so as to receive a message containing a temporary encryption key having a limited period of validity, coming from the configuration device, and to communicate according to the second mode of communication, made secure by means of the temporary encryption key, with the configuration device.

Advantageously, the communication module is arranged so as to erase the temporary encryption key upon the expiration of a period of validity of said temporary key.

The invention lastly relates to a home-automation installation comprising
- at least one control unit of a first type, designed to communicate according to a first mode of communication, and
- at least one actuator such as previously defined.

The invention will be better understood by means of the following description of the method for configuring a home-automation installation and of the method of operation of an actuator of a home-automation installation, according to various particular embodiments of the invention, and also of an associated configuration device, actuator and home-automation installation, with reference to the appended drawings in which.

From the outset, it will be noted that, in the various figures, the analogous or corresponding elements or steps carry the same references, unless otherwise stated.

Figure 1:
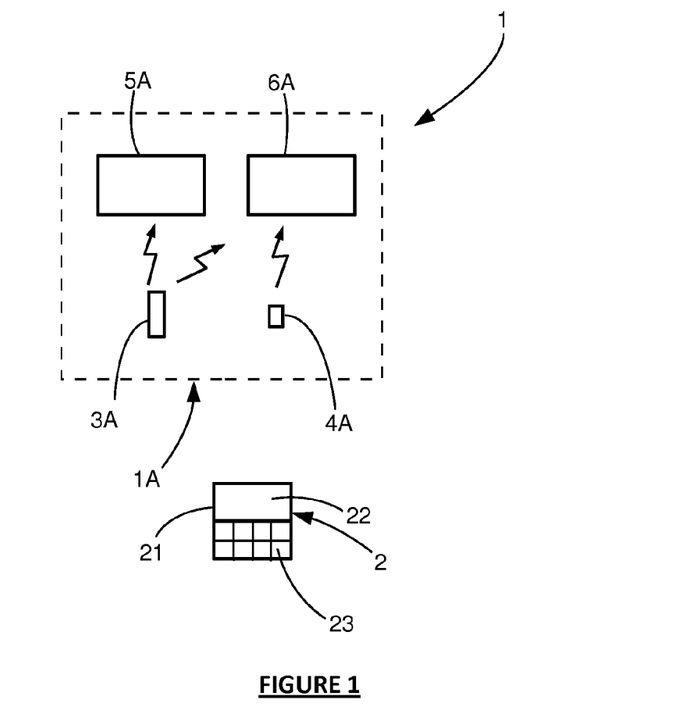
FIG. 1 shows schematically a home-automation installation, according to a first particular exemplary embodiment of the invention.

FIG. 1, shows a home-automation installation 1 according to a first particular exemplary embodiment of the invention. The home-automation installation 1 comprises control units 3A, 4A and actuators 5A, 6A. The control units 3A, 4A may be remote control units, for example mobile and wireless. The actuators 5A, 6A are designed to control associated home-automation equipment, such as motorized roller blinds, lighting, heating, ventilation and air conditioning equipment. For example, the remote control 3A is designed to control the two actuators 5A and 6A and the remote control 4A is designed to only control the actuator 6A. Thus, the remote control 3A is paired, or associated, with the two actuators 5A, 6A, whereas the remote control 4A is paired, or associated, with the single actuator 6A.

The term "pairing", or "paired", here denotes the action of creating a control unit and an actuator pair designed to communicate with each other, notably for controlling the use of the actuator and of the associated home-automation equipment.

Each control unit 3A (respectively 4A) and the actuators which are paired with it, 5A, 6A (respectively 6A), are designed to communicate with each other according to a first mode of communication. For this reason, they are said to be "of a first type". More precisely, the control units 3A and 4A are said to be "of a first type" owing to the fact that they are capable of communicating according to the first mode of communication with any other communicating entity, notably actuators. The actuators are said to be "of a first type" owing to the fact that they are capable of communicating according to the first mode of communication, during an operation in utilization mode.

The phrase "operation in utilization mode" is understood to denote the operation of an actuator when it is used for driving and controlling the home-automation equipment with which it is associated, or paired. For example, in the case of an motorized roller blind actuator, the operation in utilization mode notably corresponds to the opening and/or the closing of the roller blind.

The first mode of communication between an actuator and a control unit exhibits for example the following features:
- the communications between the actuator and the control unit are unidirectional: the control unit can only send messages and the actuator can only receive messages;
- the actuator has an identifier $ID_{PdC}$ of the control unit (or control units) stored in memory with which it is authorized to communicate;
- the control messages sent by the control unit to the actuator contain the identifier $ID_{PdC}$ of the control unit;
- the actuator verifies the identifier contained in the control messages received and only executes the commands if it recognizes the identifier $ID_{PdC}$ of the control unit.

Since this first mode of communication here is unidirectional, it is also denoted as "1W" (meaning "One-Way").

The first mode of communication disposes of a first level of security, based here on the verification of the identity of the control unit having transmitted the control message. It therefore qualifies as a secure mode of communication.

The first mode of communication could however exhibit features that are different from those mentioned above, as a whole or in part.

The actuators 5A, 6A are furthermore capable of communicating according to a second mode of communication with a configuration device 2, during an operation in configuration mode.

The phrase "operation in configuration mode" is understood to denote the operation of an actuator when it is configured, in other words when it is programmed and/or set up in order to provide a desired operation. For example, in the case of a motorized roller blind actuator, the operation in configuration mode allows a software update to be installed in the actuator, parameters of the actuator relating to the opening and/or the closing of the roller blind to be adjusted, or alternatively communications of the actuator with one or more control units to be configured.

The second mode of communication has a level of security here which is higher than that of the first mode of communication as it uses an encryption key. This key is used to effect encryption operations designed to render the communications between two communicating entities secure, notably between an actuator and a control unit. For example, the key is a secret key shared by the two communicating entities and is designed to encrypt the messages transmitted between the two entities. According to the second mode of communication, the two communicating entities may communicate with each other:

in a unidirectional manner, one of the entities (for example the control unit) only communicating as a transmitter, and the other entity (for example the actuator) only communicating as a receiver, or in a bidirectional manner, each entity being able to communicate both as a transmitter and as a receiver.

In the first case (unidirectional), the second mode of communication may be denoted as "1W" (i.e. "1-Way"). In the second case (bidirectional), the second mode of communication may be denoted as "2W" (for "2-Way"). In the particular exemplary embodiment described here, the second mode of communication used by the device of communication 2 for communicating with the actuators 5A, 6A is bidirectional, or 2W.

The first and second modes of communication may use the same communications protocol, for example io-home-control (registered trademark).

The actuators of the first type 5A, 6A may be configured using a configuration device 2.

Figure 5:
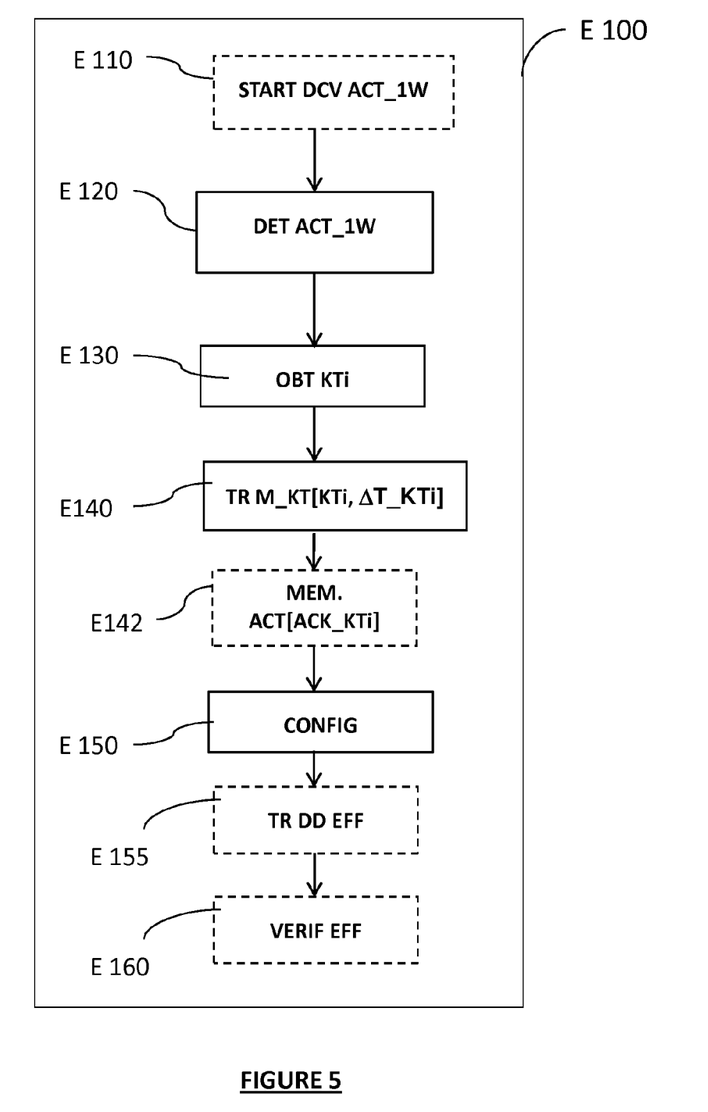
FIG. 5 shows a flow diagram of steps of the method for configuring a home-automation installation, according to a first embodiment of the invention.

With reference to FIG. 5, a first embodiment of the method E100 for configuration of the home-automation installation 1 will now be described, according to the invention. The configuration is carried out using the configuration device 2. It can be carried out by a user, for example a home-automation installer equipped with the configuration device 2. In FIG. 5, the steps framed in dashed lines (E110, E142, E155, E160) are optional.

The method comprises a first step E110 for triggering an operation in configuration mode, also referred to as "discovery mode", of the actuators 5A and 6A. The triggering into configuration mode of an actuator 5A (respectively 6A) consists in performing a predetermined action on a control unit 3A (respectively 3A or 4A) with which the actuator is designed to communicate, in other words with which it is paired. For example, the triggering action may consist for the user in pushing a specific button of the control unit, such as a "PROGRAMMING" button. The control unit then sends a message to request switching into discovery mode or configuration mode to the actuator or actuators with which it is paired. Upon receiving the request, the actuators 3A and 4A goes into discovery (or configuration) mode. For example, the user pushes the "PROGRAMMING" button of the control unit 3A, an action which makes the two actuators 5A and 6A switch into discovery mode. When the actuators 5A and 6A are in configuration mode, they are capable of communicating in a bidirectional manner with the configuration module 2. Also, after having switched into configuration mode, the actuators 5A and 6A each send a discovery message M_DCV$_{5A}$, M_DCV$_{6A}$ (step S110).

This step E110 is however optional because the actuators can spontaneously send discovery messages, for example when they are powered up, or periodically, or else for as long as they have not yet been configured in the case of virgin actuators.

The discovery message for an actuator contains characteristic data relating to this actuator, notably product characteristics, which may comprise an identifier of the actuator ID$_{ACT}$, an identifier of the manufacturer of the actuator, the indication of a software version implemented in the actuator, the type of the actuator (here "first type").

The method continues with a step E120 for determining at least one actuator able to be configured. During this step E120, the configuration device 2 receives the discovery messages coming from the actuators 5A, 6A for the home-automation installation 1. Based on these messages, it verifies the capacities of the actuators for managing a temporary encryption key, in other words whether they are capable of recognizing, of storing in memory, of using and of erasing from their memory (even without an explicit erase order) a temporary encryption key. It subsequently determines the actuator or actuators of the first type that are capable of managing a temporary encryption key and are consequently able to be configured. Here, during the step E120, the configuration device 2 determines that the two actuators 5A and 6A are able to be configured.

As a variant, the step E120 for determining at least one actuator able to be configured could be carried out by actions executed by a user, by means of the man-machine interface 21 of the configuration device 2, or else by a configuration file previously transmitted to the configuration device 2.

The method subsequently comprises a step E130 for obtaining a temporary encryption key KTi. During this step E130, the configuration device 2 generates a temporary encryption key KTi which has a limited period of validity ΔT_KTi. The letter "i" denotes a temporary key index: upon each generation, and more generally each time a new temporary key is obtained, the index i is incremented by 1. The period of validity ΔT_KTi may be predetermined, in other words fixed in advance. In this case, it is for example equal to x minutes, for example 60 minutes. The temporary encryption key KTi is intended to be used to render the communications between the actuators 5A, 6A, determined at the step E120, and the configuration device 2 secure during a configuration of these actuators. The predetermined period of validity ΔT_KTi is therefore designed to cover the duration of such a configuration operation.

As a variant, the temporary encryption key KTi may have been generated in a prior step, in other words in advance, either by the configuration device 2 itself or by another entity (for example a secure server accessible over a communications network) designed to supply the temporary keys to the configuration device 2. The configuration device 2 could, in this case, store in memory a batch of pre-calculated temporary encryption keys. Once all the temporary keys in the batch have been distributed, the configuration device 2 could obtain and store a new batch of temporary keys in a secure manner.

Following the step E130, the configuration device 2 distributes the temporary key KTi to the actuators 5A, 6A determined during the step E120, by transmitting a message M_KT containing the key KTi to each actuator, during a transmission step E140. The configuration device 2 also transmits the period of validity ΔT_KTi of the key KTi. Here, the message M_KT transporting the temporary key KTi also contains the period of validity ΔT_KTi of the key. It could also be envisioned for different temporary keys, for example KTi and KTi+1, to be transmitted to the various actuators 5A, 6A, respectively. The period of validity may be the same for all the temporary encryption keys.

As a variant, the actuators 5A, 6A could store in memory a predetermined period ΔT_KT of validity of a temporary encryption key. This period ΔT_KT could have been previously recorded by each actuator during a configuration and/or at the end of production in the factory. In this case, the configuration device 2 does not need to transmit the predetermined period of validity of the temporary key.

During a step S140, the actuators 5A, 6A receive the temporary key KTi and here the predetermined period of validity ΔT_KTi, transported in the message M_KT, and record this data in memory. Upon receiving the key KTi, each actuator 5A, 6A starts a timer in order to count the time passed since the receipt of the key KTi and to monitor the expiration of the period ΔT_KTi.

The method continues with a communication step E150, implemented by the configuration device 2 which communicates with each actuator 5A, 6A, according to the second mode of communication. This step allows the device 2 to configure each actuator 5A, 6A. The configuration device 2 and each actuator 5A, 6A communicate with each other in a bidirectional manner. The communications are made secure by means of the temporary encryption key KTi. During this step E150, the device 2 configures the actuators 5A, 6A in a known manner, notably by transmitting to them 5A, 6A configuration data such as operational parameters for the home-automation equipment controlled by the actuator, a software update of the software installed in the actuator, or any other type of configuration data. The reference S150 denotes the corresponding communication step implemented by each actuator 5A, 6A.

After the configuration E150, the timer, previously triggered by each actuator 5A, 6A upon receiving the temporary key KTi, reaches the predetermined period of validity ΔT_KTi. At the expiration of the period ΔT_KTi, of its own accord, and hence automatically, each actuator 5A, 6A erases, or eliminates, the temporary key KTi from its memory.

It could be envisioned for each actuator 5A, 6A to transmit a message "M_END_VAL" confirming the end of validity of the key KTi, confirming the effective erasure of the key KTi, destined for the configuration device 2, during a step S160. In this case, the configuration device 2 could verify whether the actuators 5A, 6A have indeed confirmed the erasing of their temporary key, during a step E160. In the case where an actuator had not confirmed the erasing of the temporary key KTi, the configuration device 2 could trigger an action for managing the defective actuator, for example:

- display the identifier of the defective actuator on the screen 22 in order to allow the user to take the appropriate measures (for example trigger a key erasure upon an explicit command from the configuration device 2), and/or
- transmit the identifier of the defective actuator to a management server, via a communications network, in order to add it to a "black" list of actuators judged to be defective or non-compliant.

In the preceding description, the period of validity ΔT_KTi of the temporary encryption key KTi is predetermined and transmitted by the configuration device 2 to the actuators 5A, 6A able to be configured. This constitutes an implicit command for erasing the temporary key KTi. At the expiration of this period of validity ΔT_KTi, each actuator erases the temporary key of its own accord from its memory.

According to one variant embodiment, the period of validity ΔT_KTi is determined by sending an end of validity message coming from the configuration device 2 and destined for the actuators 5A, 6A having received the key KTi. In this case, the erasing of the temporary key KTi by the actuators 5A, 6A having previously received it and stored it is triggered upon receipt of an explicit message coming from the configuration device 2. This message contains an erase command and/or an indication of end of validity of the temporary key KTi. In either case, it constitutes a request to erase the key KTi. The temporary key KTi may thus be transmitted to the determined actuators 5A, 6A without a pre-defined period of validity. After configuration E150 of the actuators 5A, 6A, the configuration device 2 transmits to each actuator 5A, 6A a message requesting erasure of the temporary key KTi, during a step E155. Upon receipt of the erase request, each actuator 5A, 6A erases the temporary key KTi from its memory.

The configuration device 2 may also, after sending the temporary key KTi, during a step E142, store the identifiers of the actuators having confirmed the receipt of the key KTi by sending an acknowledgement message ACK_KTi. Later on, following the configuration E150 and the sending E155 of a request to erase the key KTi, the actuators 5A, 6A having effectively erased their key can transmit a message confirming the end of validity of the key to the configuration device 2, as previously described. The configuration device 2 can then verify whether the actuators having received the key KTi have indeed confirmed the erasure of the latter, during a step E160. In the case where an actuator has not confirmed the erasing of the temporary key KTi, the configuration device 2 can trigger an action for managing the defective actuator (display on the screen 22 and/or transmission to a server for managing the identifier of the defective actuator).

Figure 6:
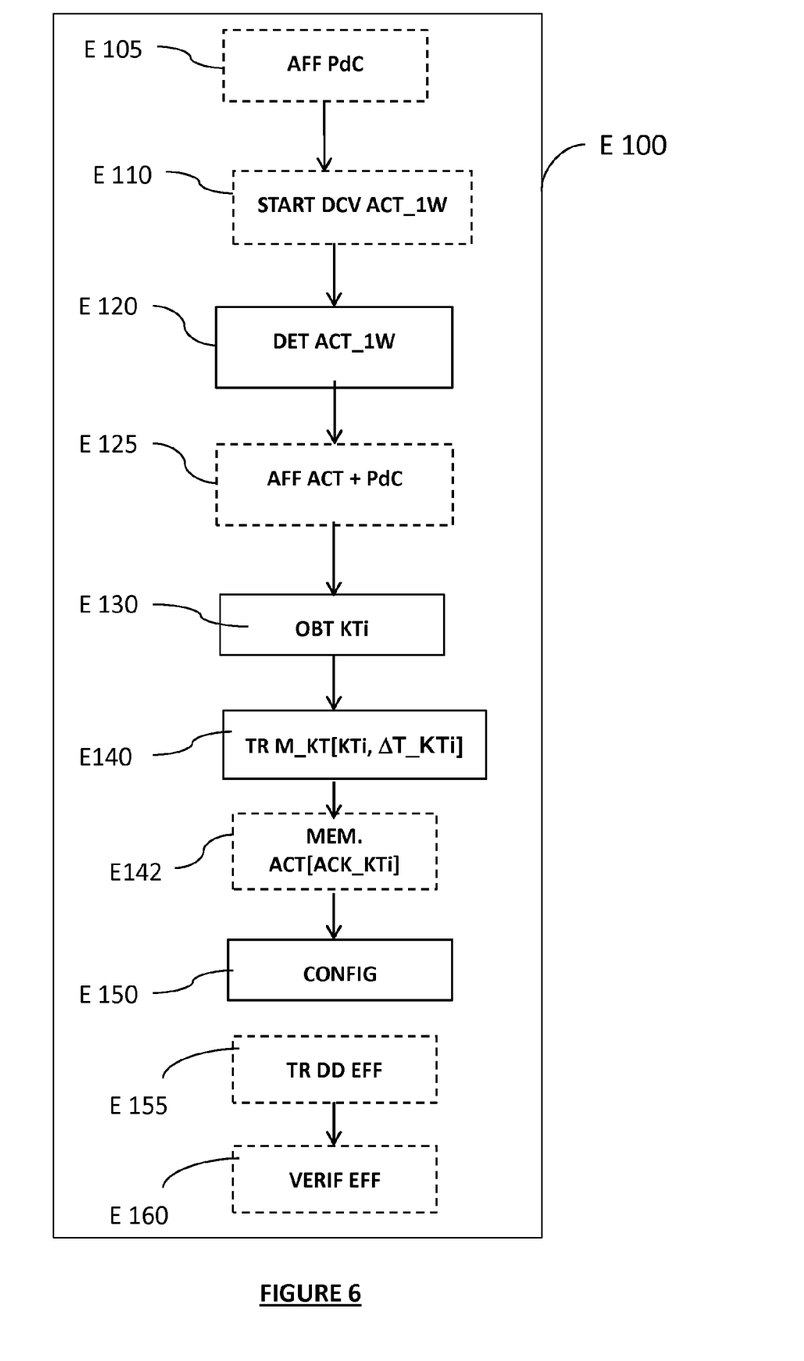
FIG. 6 shows a flow diagram of steps of the method for configuring a home-automation installation, according to one variant embodiment of the method in FIG. 5.

As previously indicated, the steps E110, E142, E155 and E160 are optional. FIG. 6 shows the method E100, according to another variant embodiment of the method in FIG. 5, which differs from the embodiment (and from its variants) described with reference to FIG. 5 by the addition of other optional steps E105 and E125. For the sake of clarity, only these optional steps are described hereinafter. The steps E105 and E125 may be added independently of each other.

The step E105, implemented prior to the step E110, is a step for displaying on the screen 22 of the configuration device an indication of the control units that should be stimulated (in other words on which it is necessary to act) in order to trigger the switching of the actuators into discovery mode. In the example described here, the screen 22 is displaying that the control unit 3A needs to be acted on in order to trigger a switch of the actuators 5A and/or 6A into discovery mode and the control unit 3B needs to be acted on in order to trigger a switch of the actuator 6A into discovery mode. This pairing information is obtained in a prior step by the configuration device 2 during a communication with the control units 3A and 4A or with the actuators 5A and 6A.

The step E125, implemented after the step E120 and prior to the step E130, consists in displaying on the screen 22 the results of the discovery of the actuators, in other words the actuators discovered and control units with which they are paired.

Figure 8:
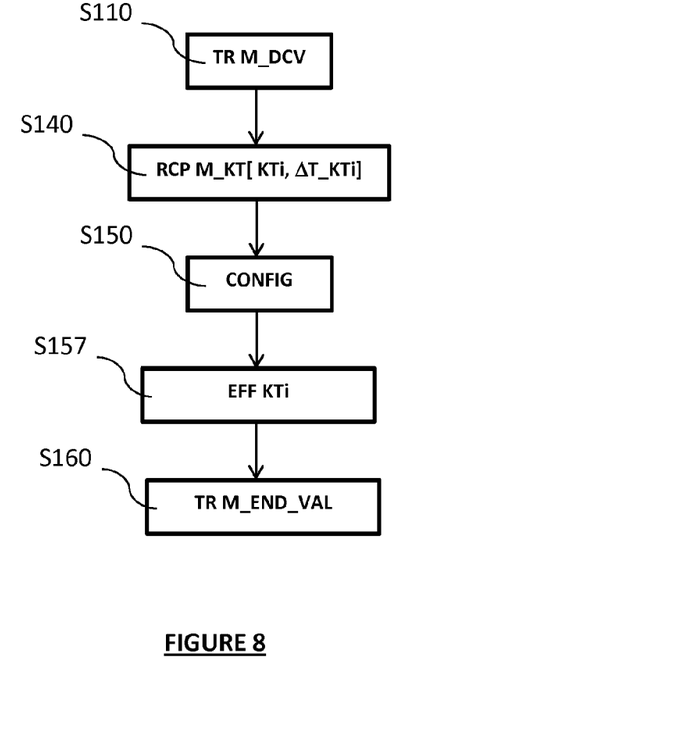
FIG. 8 shows a flow diagram of steps of the method of operation of an actuator, according to one particular embodiment of the invention.

The invention also relates to a method of operation of an actuator belonging to a home-automation installation. This method of operation comprises the steps previously described which are implemented by an actuator (5A or 6A). With reference to FIG. 8, it notably comprises the following successive steps:

a step S110 for sending a discovery message M_DCV;

a step S140 for receiving a message containing a temporary encryption key KTi and here a predetermined limited period of validity ΔT_KTi, coming from the configuration device, a step S150 for communicating according to the second mode of communication, made secure by means of the temporary key KTi, with the configuration device 2, notably in order to configure the actuator 5A (or 6A), and advantageously, a step S157 for erasing the temporary key KTi from the memory of the actuator 5A (or 6A);

again advantageously, a step S160 for sending a message confirming the end of validity of the temporary key KTi, confirming the erasing of the latter.

It goes without saying that the optional steps previously described may, as a whole or in part, be integrated into the method of operation of the actuator 5A (6A).

A second embodiment of the configuration method E100 will now be described with reference to FIGS. 2A, 2B and 7.

Figure 2A:
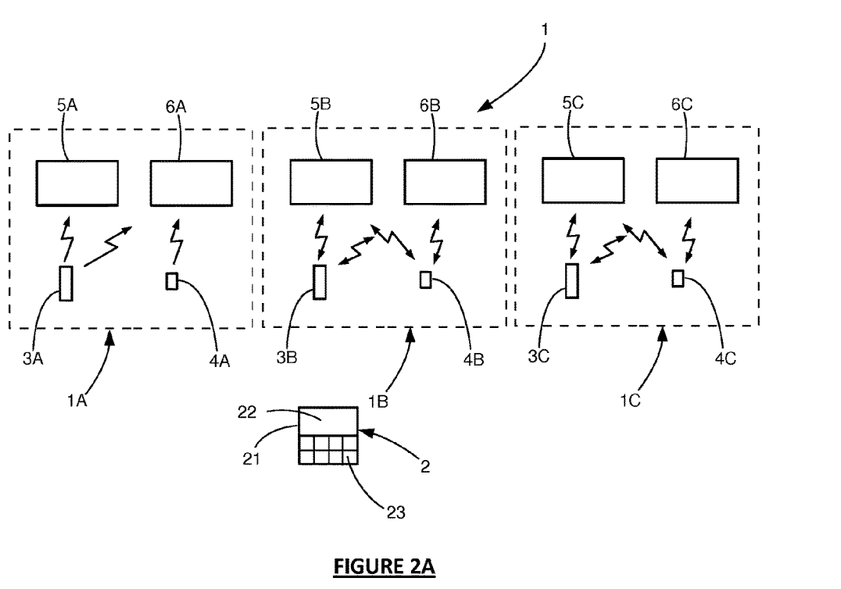
FIGS. 2A and 2B show schematically a home-automation installation, according to a second particular exemplary embodiment of the invention, respectively before and after configuration.

FIG. 2A shows a second particular exemplary embodiment of a home-automation installation according to the invention, before configuration. This home-automation installation 1 comprises three parts 1A, 1B and 10. This division of the installation 1 into three parts is purely virtual and intended to facilitate the understanding of the invention.

The part 1A of the home-automation installation 1 comprises the entities in FIG. 1A, namely two control units 3A, 4A of the first type, and two actuators 5A, 6A of the first type. The control unit 3A is paired with the two actuators 5A and 6A, and the control unit 4A is paired only with the actuator 6A.

The part 1B of the home-automation installation 1 comprises control units 3B and 4B and actuators 5B and 6B. The control units 3B, 4B and the actuators 5B, 6B with which they are paired are designed to communicate between them according to the second mode of communication, and are said to be "of the second type". More precisely, the control units 3B and 4B are said to be "of the second type" owing to the fact that they are capable of communicating according to the second mode of communication. The actuators 5B, 6B are said to be "of the second type" owing to the fact that they are capable of communicating according to the second mode of communication, during an operation in utilization mode. In the example shown in FIG. 1B, each control unit 5B (respectively 6B) is paired with the two actuators 5B, 6B. As a reminder, the second mode of communication uses an encryption key to make the communications secure and here is bidirectional (or 2W). Each control unit of the second type 3B (respectively 4B) possesses an encryption key that is specific to it, denoted K_PdC$_{3B}$ (respectively K_PdC$_{4B}$). The actuators 5B, 6B designed to communicate with this control unit 3B (respectively 4B) dispose of the encryption key K_PdC$_{3B}$ (respectively K_PdC$_{4B}$) for the control unit, which is stored in memory. The actuators 5B, 6B are also designed to communicate with a configuration device, such as the device 2, according to the second mode of communication, using an encryption key to make the communications between actuator and configuration device secure.

Prior to configuration (FIG. 2A), the third part 10 is analogous to the second part 1B. It comprises two control units 3C, 4C of the second type and actuators 5C and 6C of the second type. Each actuator 5C (respectively 6C) is paired with the two control units 3C, 4C. Each control unit 3C (respectively 4C) possesses an encryption key K_PdC$_{3C}$ (K_PdC$_{4C}$) that is specific to it. The actuators 5C, 6C each dispose of these two keys K_PdC$_{3C}$ and K_PdC$_{4C}$ in memory.

It is pointed out that an actuator may be "mixed", in other words both of the first type and of the second type, and hence also both 1W and 2W. This is notably the case when the actuator is paired with at least one control unit X of the first type and with at least one control unit Y of the second type. The actuator is therefore of the first type with respect to the control unit X and of the second type with respect to the control unit Y. In contrast, a control unit is either of the first type or of the second type, and hence here either 1W or 2W.

Figure 7:
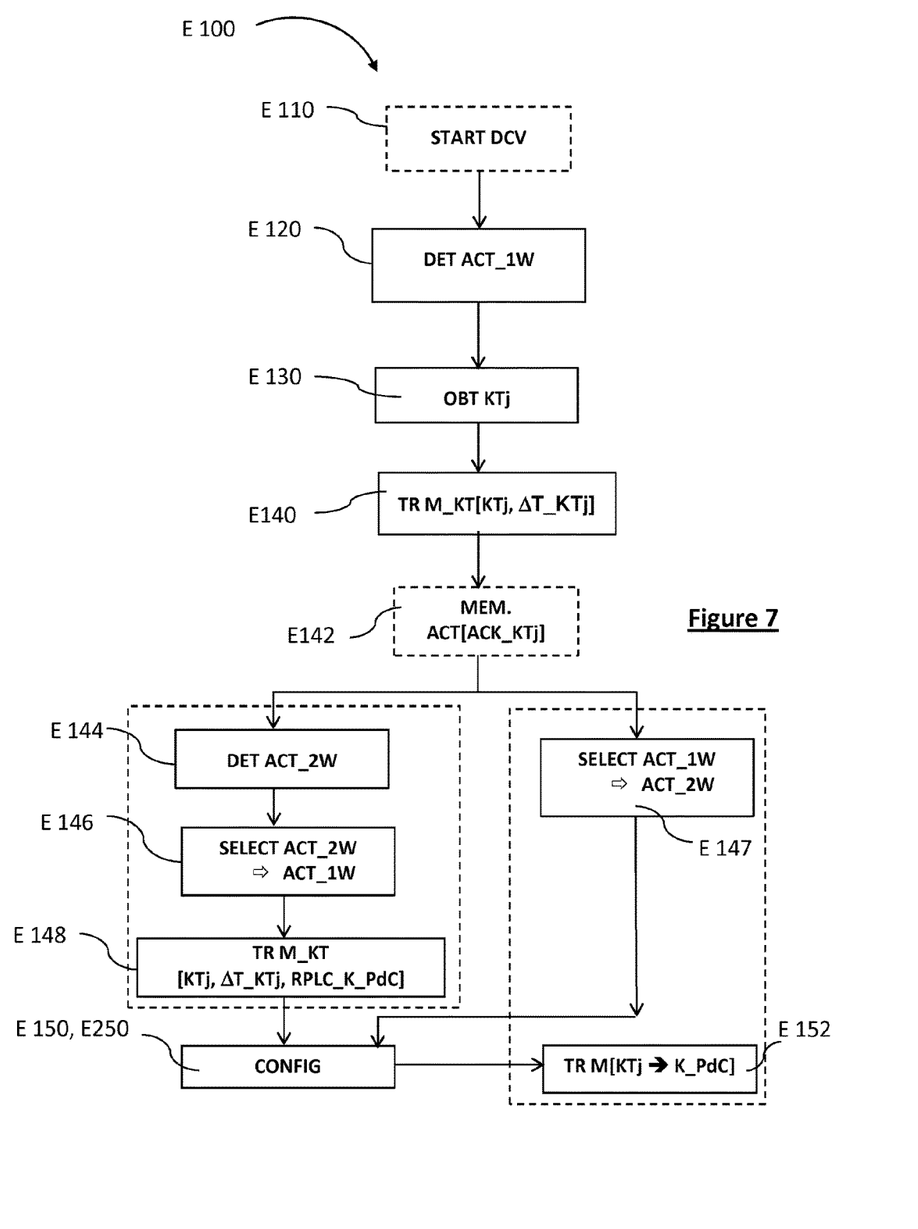
FIG. 7 shows a flow diagram of steps of the method for configuring a home-automation installation according to a second embodiment of the invention.

With reference to FIG. 7, the configuration method comprises steps E120, E130 and E140 (analogous to the corresponding steps described with reference to FIG. 5) implemented by the configuration device 2 for the actuators of the first type 5A, 6A of the installation 1. Of course, if the home-automation installation 1 comprises other actuators of the first type, notably in another part of the installation, for example a mixed actuator (in other words of the first type with respect to a control unit X and of the second type with respect to another control unit Y), the steps E120, E130 and E140 are also executed for this other mixed actuator. Thus, after having determined the actuators of the first type of the installation 1 able to be configured (step E120), the configuration device 1 obtains a temporary encryption key KTj (step E130) and distributes this key KTj, with an associated predetermined period of validity ΔT_KTj, to the actuators 5A, 6A of the first type determined as being able to be configured (step E140). All or part of the optional steps previously described, notably the steps E110 and E142 (appearing in FIG. 6) but also the steps E105 and E125A, may be additionally implemented for the actuators of the first type 5A, 6A.

The configuration method also comprises steps (E144, E146 and E148) allowing one or more actuators of the second type (with respect to a control unit of the second type) to be transformed into actuator(s) of the first type (with respect to another control unit of the first type). This transformation may be carried out for example at the time of a change of control unit, when a control unit of the first type is substituted for a control unit of the second type. It allows an actuator of the second type with respect to one or more control units of the second type to be transformed into an actuator which is either exclusively of the first type with respect to one or more new control units of the first type, or "mixed", in other words of the second type with respect to one or more control unit(s) of the second type and of the first type with respect to one or more new control unit(s) of the first type.

For example, the case may be considered where the control unit 4C of the second type is replaced by a new control unit 4C' of the first type. In this case, it is advantageous to transform the actuators 5C, 6C, which are initially exclusively of the second type, into mixed actuators 5C, 6C, which are of the second type with respect to the control unit 3C and of the first type with respect to the substitution control unit 4C'.

The step E144 allows the configuration device 2 to determine the actuators of the second type able to be configured. This step E144 is analogous to the step E120, except for the fact that it is implemented for the actuators of the second type of the home-automation installation 1. Thus, during this step E144, the configuration device 2 receives discovery messages originating from the control units of the second type 3B, 4B, 3C, 4C and/or from the actuators of the second type 5B, 6B, 5C, 6C of the home-automation installation 1. The sending of these discovery messages by the actuators of the second type may have been triggered by a predetermined action (pushing a button "PROGRAMMING") carried out by a user on control units of the second type with which these actuators are paired, for example the control units 3B and 3C. Based on these discovery messages, the configuration device 2 verifies the capacities of the actuators of the second type for managing a temporary encryption key (in other words whether they are capable of recognizing, of storing in memory, of using and of erasing the temporary key from their memory, even in the absence of an explicit erase command). It subsequently determines the actuator or actuators of the second type that are capable of managing a temporary encryption key and are consequently able to be configured. Here, during the step E144, the configuration device 2 determines that the four actuators of the second type 5B, 6B, 5C, 6C are able to be configured.

The method continues with a step E146 for selecting, from amongst the actuators of the second type determined during the step E144, namely 5B, 6B, 5C, 6C, one or more actuators intended to be transformed into actuator(s) of the first type. This selection may be carried out by a user entry via the man-machine interface of the configuration device 2. As a variant, it may also be carried out by reading or using data from a configuration file previously transmitted to the configuration device 2. In the example described here, the control unit 4C of the second type (FIG. 2A) is replaced by a control unit 4C' of the first type (FIG. 2B). In this context, it is advantageous to transform the actuators 5C, 6C into actuators of the first type with respect to the control unit 4C'. It is clear that the actuators 5C, 6C can remain of the second type with respect to the control unit of the second type 3C. As a consequence, during the step E146, the configuration device 2 selects the actuators 5C and 6C. These selected actuators 5C, 6C are intended to communicate according to the first mode of communication during their operation in utilization mode, at the end of the execution of the configuration method, notably with the new control unit of the first type 4C'. They are said to be selected actuators of the second type.

The method subsequently goes to the step E148 for sending the temporary encryption key KTj to the selected actuators of the second type. During this step E148, the configuration device 2 transmits the temporary key KTj to each of the selected actuators of the second type 5C, 6C and, here, its predetermined period of validity ΔT_KTj. This temporary key data is contained in a message M_KT. Upon receiving this message, each selected actuator of the second type 5C, 6C stores the temporary key KTj and its period of validity ΔT_KTj in memory. This message M_KT could also contain a command for replacement of the encryption key specific to the control unit 4C, denoted $K\_PdC_{4C}$, by the temporary encryption key KTj. In this case, the temporary key KTj is stored in place of the previously recorded encryption key $K\_PdC_{4C}$, namely that of the control unit 4C, which is eliminated.

The method continues with the implementation of a first and of a second communication step E150, E250 respectively allowing the configuration of the determined actuators of the first type 5A, 6A and that of the selected actuators of the second type 5C, 6C. There could also be a communication step for configuring the actuators 5B, 6B if needed. The step E150 is analogous to that described previously with reference to FIG. 5. The configuration device 2 exchanges configuration data with each of the determined actuators of the first type 5A, 6A. The communication step E250 is also analogous to the step E150 previously described, except for the fact that the configuration device 2 exchanges configuration data with each of the selected actuators of the second type 5C, 6C. Furthermore, during the second communication step E250, the configuration device 2 may transmit data to the actuators 5C, 6C for managing the encryption key $K\_PdC_{4C}$ specific to the control unit of the second type 4C, for example an erase command (if the latter has not already been transmitted). The various communications E150, E250 between the configuration device 2 and the various actuators are made secure by means of the temporary encryption key KTj.

It is noted that the communication steps E150, E250 may be carried out with a certain time correlation, for example concurrently or successively, or else with no time correlation between them. These communication steps E150, E250 may in fact comprise various communications between, on the one hand, the configuration device 2 and, on the other hand, the various actuators, respectively. These various communications may be considered as various communication steps, or sub-steps, which may be carried out with a certain time correlation, for example currently or successively, or else with no time correlation between them.

As a variant, the steps E144, E146 and E148 relating to the transformation of an actuator of the second type into an actuator of the first type may be implemented prior to or in parallel with the steps E120, E130 and E140 relating to the distribution of the temporary key KTi to the actuators of the first type.

Upon receiving the temporary key KTj, each actuator 5A, 6A, 5C, 6C triggers a timer for monitoring the period of validity of the temporary key KTj. Upon expiration of the period of validity ΔT_KTj, the actuators automatically erase the temporary key KTj from their memory. As previously described with reference to FIG. 5, the end of validity of the temporary key KTj could be determined by sending an end of validity message, explicitly requesting the erasing of the temporary key, from the configuration device 2 to the actuators concerned.

The configuration method may furthermore comprise steps aimed at transforming an actuator of the first type (with respect to a control unit of the first type) into an actuator of the second type (with respect to another control unit of the second type). It may be assumed for example that it is desired to pair the actuator of the first type 6A (FIG. 2A) with the control unit of the second type 3B (FIG. 2B). In other words, it is desired that the actuator of the first type 6A be capable of communicating with the control unit of the second type 3B, according to the second mode of communication made secure by means of the encryption key $K\_PdC_{3B}$ specific to the control unit 3B, during an operation in utilization mode, following the configuration E100.

Figure 2B:
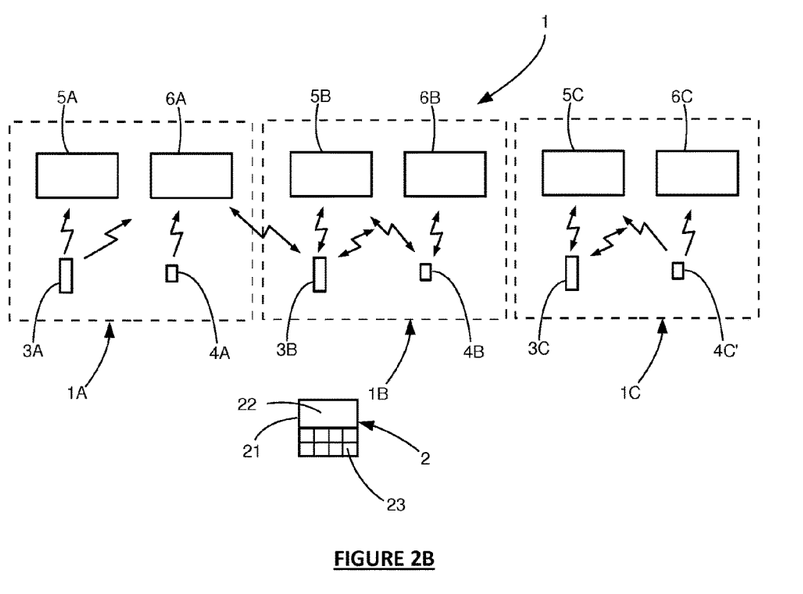

For this purpose, with reference to FIG. 2B, after the determination E120 of the actuators of the first type able to be configured and after sending E140 the temporary key KTj and, here, its period of validity ΔT_KTj to the determined actuators of the first type, the method comprises a step E147 for selecting, from amongst the actuators of the first type able to be configured 5A, 6A, at least one actuator designed to communicate according to the second mode of communication made secure by means of an encryption key specific to a control unit, during an operation in utilization mode, at the end of the execution of the configuration method E100. The actuator selected during this step E147 is said to be the selected actuator of the first type. In this example, during the step E147, the configuration device 2 selects the actuator 6A as selected actuator of the first type.

The selection step E147 is followed by the communication step E150, previously described. During this step E150, the configuration device 2 communicates with the actuator 6A (which is still of the first type with regard to its operation in utilization mode) according to the second mode of communication made secure by means of the temporary key KTj. The device 2 and the actuator 6A exchange configuration data so as to configure the actuator 6A. Thus, the configuration of the selected actuator 6A of the first type is carried out via bidirectional communications between the actuator 6A and the configuration device 2, made secure by the temporary key KTj.

Following the communication step E150, the method may comprise a step E152 for the sending by the configuration device 2 to the selected actuator of the first type 6A (or, where relevant, the selected actuators of the first type) of a message containing a command for replacement of the temporary encryption key KTj by the encryption key $K\_PdC_{3B}$ specific to the control unit 3B. This transmission step E152 may advantageously be made secure by means of the temporary key KTj. Upon receiving this message, the actuator 6A erases the temporary key KTj from its memory and replaces it with the encryption key $K\_PdC_{3B}$. As a variant, the configuration device 2 could transmit a message for end of validity of the temporary key so as to command the erasing of the temporary key KTj by the actuator 6A. As a further variant, the temporary key KTj could be erased automatically at the end of its predetermined period of validity $\Delta T\_KTj$. In these two variants, the configuration device could transmit to the actuator 6A a message requesting the recording of the key $K\_PdC_{3B}$ of the control unit, advantageously in a manner made secure by means of the temporary key KTj.

Figure 3:
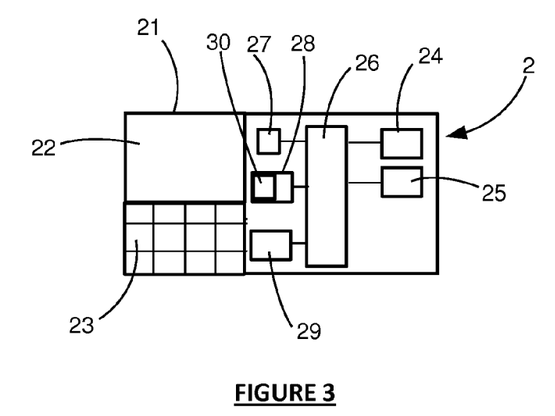
FIG. 3 shows a functional block diagram of a configuration device, according to a particular embodiment of the invention.
Figure 4:
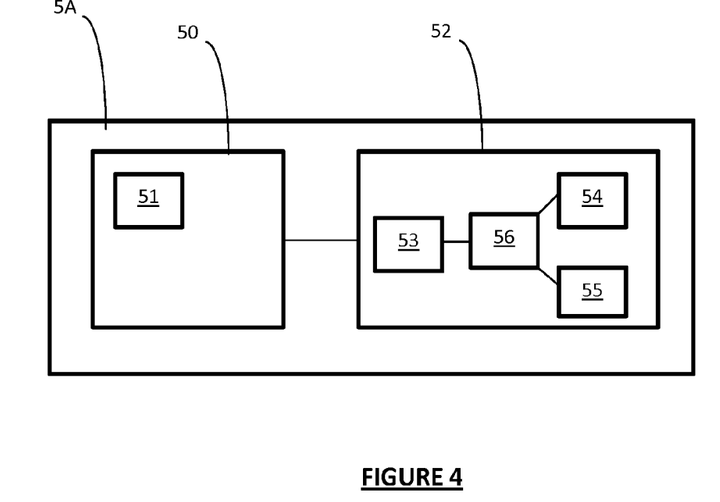
FIG. 4 shows a functional block diagram of an actuator, according to a particular embodiment of the invention.

With reference to FIGS. 3 and 4, the invention also relates to a device for configuring a home-automation installation and an actuator belonging to this home-automation installation. The latter notably comprises the part 1A, comprising:
one or more control units of the first type 3A, 4A, designed to communicate according to a first mode of communication, and
at least one actuator 5A, 6A:
designed to communicate according to the first mode of communication with at least one control unit of the first type 3A, 4A, during an operation in utilization mode, and
capable of communicating according to a second mode of communication, made secure by means of an encryption key, with a configuration device, during an operation in configuration mode.

The installation may also comprise the parts 1B and 10 of the home-automation installation 1 previously described.

With reference to FIG. 4, an actuator, such as the actuator 5A, according to one particular embodiment of the invention principally comprises a module 50 for controlling a unit of home-automation equipment, incorporating a memory 51 for storing operational parameters of the home-automation equipment, and a communication module 52, here using radio communication, incorporating a memory 53 for storing communication parameters. The communication module 52 comprises an element 54 for transmitting data, here by radio communication, an element 55 for receiving data, here by radio communication, and an element 56 for managing the communications with a control unit and/or with a configuration device. The communication module 52 is notably:
designed to communicate according to the first mode of communication with at least one control unit of the first type, during an operation in utilization mode, and
capable of communicating according to a second mode of communication, made secure by means of an encryption key, with a configuration device, during an operation in configuration mode.

Depending on its configuration, the communication module 52 is also capable of communicating according to the second mode of communication by means of an encryption key specific to a control unit, recorded in the memory 52 during an operation in utilization mode.

The communication module 52, notably the management element 56, is also designed to manage a temporary encryption key, notably:
receive and process a message containing a temporary encryption key (KTi, KTj, etc.) having a limited period of validity, coming from a configuration device, and store in memory 53 this temporary key and, where relevant, also its period of validity;
communicate according to the second mode of communication with the configuration device 2, using the temporary key received, in order to render the communications with the configuration device 2 secure;
erase the temporary key at the expiration of its period of validity, either automatically, in the case where the period of validity is predetermined, or upon receiving an end of validity message coming from the configuration device, this message constituting an explicit command to erase the temporary key;
and, advantageously, transmit a message confirming the end of validity of the temporary encryption key, destined for the configuration device, once the temporary key has been erased.

In the case where the period of validity is predetermined, it may be transmitted by the configuration device 2 in the course of the method E100 or else have previously been stored in memory (during a prior configuration or in the manufacturing process).

With reference to FIG. 3, a configuration device 2, according to one particular embodiment of the invention comprises an element 24 for receiving data, here by radio communication, and an element 25 for transmitting data, here by radio communication. The configuration device 2 also comprises a man-machine interface 21. This interface preferably comprises a screen 22 and a keyboard 23. The keyboard 23 and screen 22 assembly may consist of a touchscreen. The configuration device 2 furthermore comprises a memory 27, intended to store one or more encryption keys, a configuration module 28 and a generator 29 of temporary encryption keys. The elements 21 to 29 are connected to a central control unit 26, in this case a microprocessor, which is designed to control the operation of these elements. The generation module 29, or temporary key generator, here is a software module, stored in memory, designed to generate encryption keys, these keys being temporary and thus associated with a limited period of validity over time. The temporary keys, once generated, are intended to be recorded in the memory 27, here with data relating to their period of validity. The configuration module 28 comprises, in a memory, a computer program comprising computer program code instructions designed to carry out the steps of the configuration method of the invention which are implemented by the configuration device 2, when the program is executed by the central control unit 26. The configuration module 28 notably comprises an element 30 for managing at least one temporary encryption key having a limited period of validity. The management element 30 is notably arranged so as to determine at least one actuator able to be configured, to obtain a temporary encryption key, and to control the sending of a message containing the temporary encryption key to the at least one actuator able to be configured. The management element 30 is arranged, generally speaking, in order to implement those steps of the steps previously described that are implemented by the configuration device 2 and that relate to the management of a temporary key (KTi or KTj).

The invention claimed is:

1. A method for configuring a home-automation installation comprising:
   at least one control unit of a first type, designed to communicate according to a first mode of communication,
   at least one configuration device capable of communicating according to a second mode of communication made secure by means of a temporary encryption key specific to the configuration device, and
   at least one actuator:
      designed to communicate, at the end of the execution of the configuration method, according to the first mode of communication, with the at least one control unit of the first type, during an operation in utilization mode which is in the first mode of communication, and
      capable of communicating according to a second mode of communication, made secure by means of an encryption key, with the configuration device, during an operation in configuration mode which is in the second mode of communication,
   the method being implemented by the configuration device and comprising at least:
      determining the at least one actuator able to be configured,
      obtaining the temporary encryption key having a limited period of validity,
      sending a message containing the temporary encryption key to the at least one actuator able to be configured,
      communicating according to the second mode of communication, made secure by means of the temporary encryption key, with the at least one actuator operating in the configuration mode, and
      terminating the communicating according to the second mode of communication, wherein the temporary encryption key is erased in the at least one actuator upon the expiration of the limited period of validity of the temporary encryption key.

2. The configuration method as claimed in claim 1, wherein:
   according to the second mode of communication made secure by means of the temporary encryption key, the at least one actuator and the configuration device communicate as a transmitter and as a receiver,
   and the method furthermore comprises receiving from the at least one actuator a message confirming the end of validity of the temporary encryption key.

3. The configuration method as claimed in claim 1, wherein the determining of the at least one actuator able to be configured comprises receiving at least one message sent from the at least one actuator.

4. The configuration method as claimed in claim 1, comprising, prior to the determining of the at least one actuator able to be configured, triggering the operation of the at least one actuator in configuration mode.

5. The configuration method as claimed in claim 4, wherein the triggering consists in carrying out a predetermined action on the at least one control unit of the first type with which the at least one actuator is designed to communicate.

6. The configuration method as claimed in claim 1, wherein:
   the home-automation installation furthermore comprises at least one control unit of a second type capable of communicating according to the second mode of communication made secure by means of the encryption key specific to the at least one control unit of the second type,
   the at least one actuator is furthermore capable of communicating with the at least one control unit of the second type, according to the second mode communication made secure by means of the encryption key specific to the at least one control unit of the second type, during the operation in the utilization mode,
   and the method furthermore comprises a second communicating action according to the second mode of communication, made secure by means of the temporary encryption key, with the at least one actuator.

7. The configuration method as claimed in claim 6, wherein, during the second communicating action, the configuration device transmits data to the at least one actuator for managing the encryption key specific to the control unit of the second type.

8. A method of operation of an actuator, the actuator belonging to a home-automation installation and being:
   designed to communicate according to a first mode of communication, with at least one control unit of a first type belonging to the home-automation installation, during an operation in utilization mode, and
   capable of communicating according to a second mode of communication, made secure by means of an encryption key, with a configuration device, during an operation in configuration mode,
   the method being implemented by the actuator and comprising at least:
      receiving a message containing a temporary encryption key having a limited period of validity, coming from the configuration device,
      communicating according to the second mode of communication, made secure by means of the temporary encryption key, with the configuration device, and
      terminating the communicating according to the second mode of communication, wherein the temporary encryption key is erased in the a least one actuator upon the expiration of the limited period of validity of the temporary encryption key.

9. The method of operation as claimed in claim 8, wherein:
   according to the secure second mode of communication, the actuator and the configuration device communicate as a transmitter and as a receiver, and
   the method furthermore comprises sending a message confirming the end of validity of the temporary encryption key, destined for the configuration device.

10. A device for configuring a home-automation installation, the installation comprising:
    at least one control unit of a first type, designed to communicate according to a first mode of communication, and
    at least one actuator:
       designed to communicate according to the first mode of communication with at least one control unit of the first type, during an operation in utilization mode, and capable of communicating according to a second mode of communication, made secure by means of an encryption key, with a configuration device, during an operation in configuration mode, the configuration device comprising at least one element for managing at least one temporary encryption key having a limited period of validity, wherein the at least one element for managing the at least one temporary encryption key is arranged so as to determine the at least one actuator able to be configured, to obtain a temporary encryption key, and to send a message containing the temporary encryption key to the at least one actuator able to be configured, and terminating the communicating according to the second mode of communication, wherein the temporary encryption key is erased in the a least one actuator upon the expiration of the limited period of validity of the temporary encryption key.

11. An actuator for a home-automation installation, the installation comprising at least one control unit of a first type designed to communicate according to a first mode of communication, the actuator being:

designed to communicate according to the first mode of communication with the at least one control unit of the first type, during an operation in utilization mode, and capable of communicating according to a second mode of communication, made secure by means of an encryption key, with a configuration device, during an operation in configuration mode, wherein the actuator comprises a communication module comprising a memory adapted for recording an encryption key and arranged so as to receive a message containing a temporary encryption key having a limited period of validity, coming from the configuration device, and to communicate according to the second mode of communication, made secure by means of the temporary encryption key, with the configuration device, wherein upon termination of the communicating according to the second mode of communication, the temporary encryption key is erased in the a least one actuator upon the expiration of the limited period of validity of the temporary encryption key.

12. The actuator as claimed in claim 11, wherein the communication module is arranged so as to erase the temporary encryption key upon the expiration of a period of validity of the temporary key.

13. A home-automation installation comprising at least one control unit of a first type, designed to communicate according to a first mode of communication, and the at least one actuator as defined in claim 11 designed to communicate according the first mode of communication with the at least one control unit of the first type.

14. A home-automation installation comprising at least one control unit of a first type, designed to communicate according to a first mode of communication, and the at least one actuator as defined in claim 12 designed to communicate according to the first mode of communication with the at least one control unit of the first type.

15. The configuration method as claimed in claim 2, wherein the determining of the at least one actuator able to be configured comprises receiving at least one message sent from the at least one actuator.

16. The configuration method as claimed in claim 2, comprising, prior to the determining of the at least one actuator able to be configured, triggering operation of the at least one actuator in the configuration mode.

17. The configuration method as claimed in claim 16, wherein the triggering consists in carrying out a predetermined action on the at least one control unit of the first type with which the at least one actuator is designed to communicate.

18. The configuration method as claimed in claim 3, comprising, prior to the determining of the at least one actuator able to be configured, triggering operation of the at least one actuator in the configuration mode.

19. The configuration method as claimed in claim 18, wherein the triggering consists in carrying out a predetermined action on the at least one control unit of the first type with which the at least one actuator is designed to communicate.

20. The configuration method as claimed in claim 15, comprising, prior to the determining of the at least one actuator able to be configured, triggering operation of the at least one actuator in the configuration mode.

21. The configuration method as claimed in claim 1, comprising:

counting time passed since a receipt of the temporary encryption key and erasing the temporary encryption key at the expiration of the predetermined limited period of validity.

22. The configuration method as claimed in claim 1, comprising:

erasing the temporary encryption key upon a receipt of a message from the configuration device indicating an end of validity of the temporary encryption key.

23. The configuration method as claimed in claim 1, comprising:

verifying whether the temporary encryption key has been erased at the expiration of the limited period of validity.

24. The configuration method as claimed in claim 1, wherein the first mode of communication is without any encryption key.

* * * * *